United States Patent [19]
Soucek

[11] 3,857,427
[45] Dec. 31, 1974

[54] BULLET-PROOF TIRE

[76] Inventor: Josef Soucek, Av. Mofarrej, 476/500, Sao Paulo, Brazil

[22] Filed: Oct. 27, 1972

[21] Appl. No.: 301,265

[30] Foreign Application Priority Data
Oct. 27, 1971 Brazil .................................. 007184

[52] U.S. Cl. ................ 152/196, 152/158, 152/198, 152/330 RF, 152/347, 152/400
[51] Int. Cl. ...... B60c 17/04, B60c 21/08, B60c 9/02
[58] Field of Search ........... 152/158, 193, 196, 198, 152/379, 399, 400, 330, 353, 347, 323, 324, 327–329

[56] References Cited
UNITED STATES PATENTS

| | | | |
|---|---|---|---|
| 1,215,577 | 2/1917 | Reeder | 152/158 |
| 1,316,766 | 9/1919 | Clark | 152/400 |
| 1,322,550 | 11/1919 | Edmunds | 152/198 |
| 2,224,066 | 12/1940 | Shore | 152/158 |
| 2,242,788 | 5/1941 | Marks | 152/158 |
| 2,308,959 | 1/1943 | Brink | 152/158 |
| 2,546,858 | 3/1951 | Griffith | 152/198 |
| 2,749,960 | 6/1956 | Schwartz | 152/330 |
| 2,788,839 | 4/1957 | Kindle et al. | 152/330 |
| 3,114,409 | 12/1963 | Iknayan et al. | 152/330 |
| 3,495,645 | 2/1970 | Gough | 152/330 |

Primary Examiner—Drayton E. Hoffman
Attorney, Agent, or Firm—Toren, McGeady and Stanger

[57] ABSTRACT

A bullet-proof tire arranged to be mounted on a wheel rim includes an elastic separating ring which is positioned on the rim and extends between the insides of the tire beads and presses the beads against the flanges of the rim. The separating ring has a height in the radial direction greater than the height of the flanges on the rim so that the tire can be used even when it looses pressure. An elastomer reinforcing layer is positioned intermediate the inner and outer surfaces of the tire and the reinforcing layer may include steel wire. Further, a layer of an elastomer acting as a seal is formed on the inner surface of the tire. The separating ring is reinforced by circumferentially extending steel cables and to reduce its weight and facilitate mounting on the wheel rim, the ring can be provided with grooves formed on at least one of its inside and outside surfaces and with an air filled hollow chamber extending circumferentially through its interior. Moreover, to assist in providing a seal between the ring and the tire, the sides of the ring which contact the tire can be made of a softer rubber material than the remainder of its body and grooves can be formed in its sides which contact the tire.

26 Claims, 11 Drawing Figures

BULLET-PROOF TIRE

SUMMARY OF THE INVENTION

The present invention is directed to a reinforced tire construction to provide it with bullet-proof characteristics and, more particularly, it is directed to an elastic separating ring used in combination with the tire and to special reinforcing layers formed within the tire.

One of the primary objects of the present invention is to provide reinforced side walls in a tire so that when internal air pressure is low or completely exhausted, excessive flexing of the tire walls can be avoided, permitting the tire to support its normal load under driving conditions. Another object of the invention is to provide the body of the tire with an elastic reinforced internal layer for protecting the tire chords, in particular when they are pierced or perforated by projectiles, grenade splinters, shrapnel and the like.

Still another object of the present invention is to afford a seal for the interior of the tire to prevent, to the extent possible, escape of air when the tire is perforated by a projectile and the like. To prevent the loss of air from within the tire through small holes in its casing and to diminish the passage of air from the tire in the event it is perforated, in addition to the special elastic reinforcing layer mentioned above, an additional uniform layer of approximately 3 mm is formed in the tire. The additional uniform layer can be positioned at different locations within the tire, for example, on the inside surface of the tire, between the body of the tire and the reinforcing layer, and within the interior of the reinforcing layer. When the uniform layer is located within the body of tire the advantage exists that it is much more protected against deformation and displacement caused by eccentric forces.

Moreover, another object of the invention is to provide an improved bullet-proof vehicle tire capable of continuing to operate effectively at reduced tire pressure or when the pressure is completely lost without causing the destruction of the tire body. Under such conditions, the tire can be run for more than 100 km, at a normal speed of up to 100 km per hour, without adversely affecting the continued use of the tire.

Accordingly, another object of the invention is to provide a tire which can be repaired and reused even when it has been run at speeds of about 100 km per hour without air pressure.

Therefore, in accordance with the present invention, an elastic separating ring is provided on the wheel rim extending between the insides of the beads of the tire to retain the beads in normal operating position on the wheel rim, especially when the tire loses pressure. The separating ring can be formed of an elastomer or similar material or a combination of such materials which afford adequate rigidity and which is not flammable.

With the tire beads or free edges of the tire secured against the flanges of the rims by the separating ring, it is possible for the tire to support the load of the vehicle and, at the same time, prevent contact of the rim flanges with the sides of the tire and with the ground so that the side walls of the tire are not cut or damaged under such operating conditions.

Additionally, with the separating ring mounted on the wheel rim, it is possible for the vehicle to run at a reduced speed even if the tire is damaged or has been displaced from the wheel.

There has been a tubeless tire used which consists of a conventional tire mounted on a rim with a protective rubber tube positioned inside the tire and with compressed air filled within the cavity. The success of such a tire depends chiefly on the seal provided between the beads of the tire and the rim of the wheel. However, the rim may have various defects which interfere with the seal, for example, loose rivets and defects in the rim caused by impacts and the like.

Consequently, the present invention affords a tire construction consisting of a reinforced tire and an elastic separating ring positioned between the beads of the tire for forming a hermetically closed chamber in the tire.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
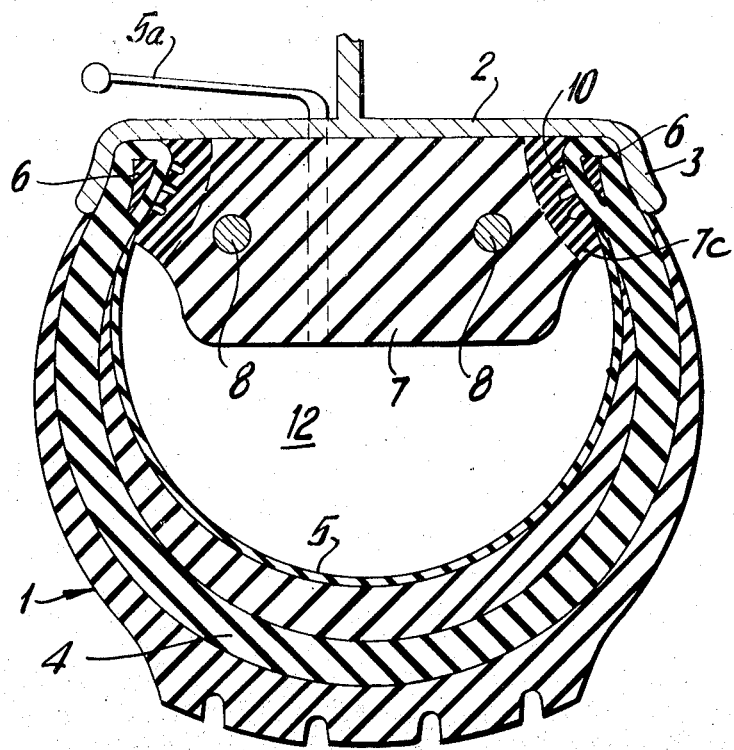
FIG. 1 is a transverse section of a tire assembly embodying the present invention mounted on a wheel rim.

In FIG. 1 a tire assembly including a tire 1 and an elastic separating ring 7 are shown mounted on a wheel rim 2. The separating ring 7 is mounted directly on the rim 2 and extends transversely between and maintains the beads 6 of the tire against the flanges 3 of the rim. With this arrangement it is possible to continue to use the tire assembly even when the air pressure within the tire is below the normal limit because the separating ring formed of an elastomer secures the tire beads 6 in position against the rim and thereby avoids destruction of the tire even though it continues to be used under reduced or zero pressure conditions.

The use of tires under reduced pressure conditions may be particularly advantageous when travelling over soft and sandy ground.

In the past, bullet-proof tires, operating without any air pressure, have had a limited useful life, accordingly, the present invention affords an elastic separating ring positioned within and extending between the free edges or beads of the tire with the ring having such dimensions that, even when operating under zero pressure conditions, the radial dimension of the ring is such that it prevents the wheel rim flanges from contacting the side walls of the tire and damaging the tire body.

When the tire loses its normal operating air pressure, the side walls of the tire are reinforced by a layer of special reinforced elastomer so that the tire can continue to support the vehicle load without any damage being experienced to the cords in the body of the tire. To afford the requisite strength for the side walls of the tire they may be formed thicker than the treads of the tire.

In FIG. 1 the tire 1 is mounted on the rim 2 with its beads 6 in contact with the inner surfaces of the flanges 3 of the rim. The side walls and tread of the tire are provided with an internal reinforcement 4 spaced between the inner and outer surfaces of the tire and extending from one to the other bead of the tire. The elastomer separating ring 7 is mounted on the rim 2 and extends laterally across the rim between the inside surfaces of the tire at its free ends or beads 6. The ring 7 forces the beads outwardly and secures them in a tightly held manner against the flanges 3 of the rim. Extending through the rim 2 and the separating ring 7 is a valve 5a for inflating the air chamber 12 within the tire, it can be noted that the air chamber is defined by the inner surface of the tire lined with a layer 5 and the surface of the separating ring 7.

Steel cables 8 extend circumferentially through the separating ring 7.

In addition to the conventional tire construction formed in accordance with the standard specifications, the reinforcing layer 4 is formed of a natural rubber butyl compound or bromobutyl rubbers. To afford the requisite strength for the flexure areas of the tire, that is in its side walls, the side walls can be thicker than the tread so that sufficient rigidity is provided to support the vehicle load acting on the tire when its air pressure is reduced or completely lost. To provide the rigidity for the sides of the tire, the tire, in accordance with the present invention, can be provided with a side wall thickness which is three times that of the normal side wall thickness of a conventional tire. Another purpose of the increased radial dimension of the separating ring 7, having a considerably greater height dimension than that of the flanges 3, is to afford sufficient support for the side walls of the tire in the event emergency operating conditions exist.

Figure 7:
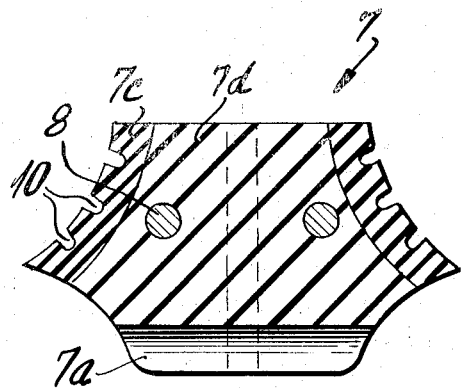
FIG. 7 is a transverse view of another embodiment of a portion of the tire assembly.
Figure 8:
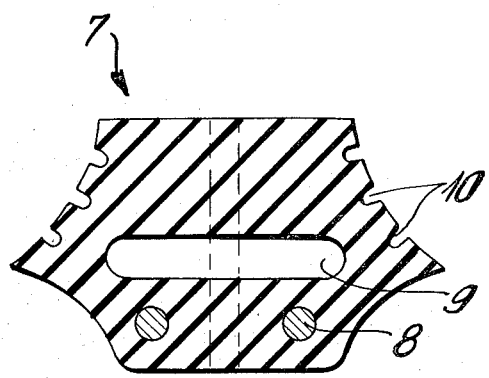
FIG. 8 is a view, similar to FIG. 7, showing still another embodiment of a portion of the tire assembly.
Figure 9:
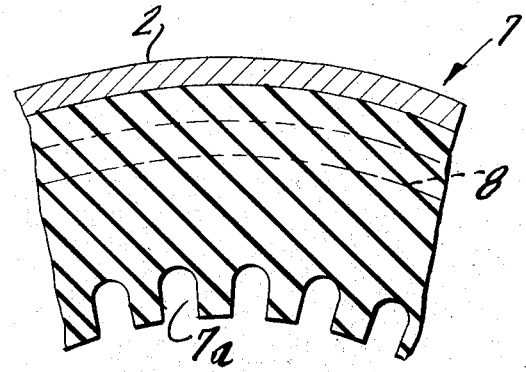
FIG. 9 is a partial longitudinal view of that portion of the tire assembly illustrated in FIG. 7.
Figure 11:
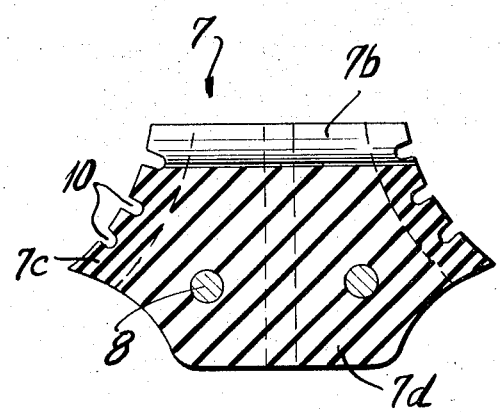
FIG. 11 is a transverse view of that portion of the tire assembly shown in FIG. 10.
Figure 10:
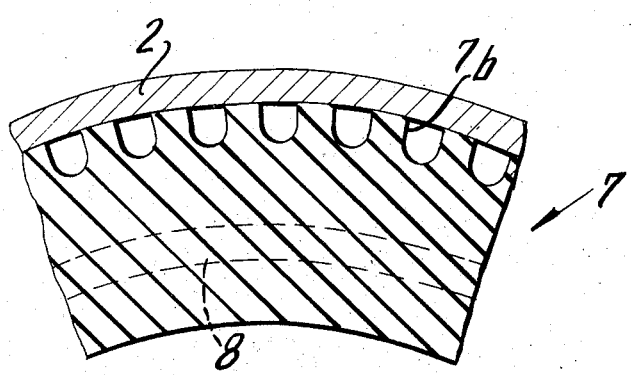
FIG. 10 is a partial longitudinal view of that portion of the tire assembly illustrated in FIG. 11.

As shown in FIGS. 7 to 11, the elastic separating ring 7 has circumferentially extending hollow channels and transversely extending grooves for reducing the weight of the ring and facilitating its mounting on the wheel rim. As shown in FIGS. 7 and 9, the transverse grooves are formed on the outer surface of the ring, that is, the surface facing into the chamber formed by the tire and the ring. Alternatively, the transverse grooves can be formed on the radially inner face of the ring, that is the face contacting the surface of the wheel rim 2, as shown in FIGS. 10 and 11. Further, as illustrated in FIG. 8, a circumferentially extending hollow channel can be formed in the ring 7.

In FIG. 7 the ring 7 is shown formed of two separate elastomer materials, that is either natural rubber or synthetic rubber materials. The sides 7c of the ring which contact the free edges of the tire are formed of a softer elastomer material than the interior zone 7d which forms the remainder of the body of the ring. Since the edges 7c are formed of a softer material, they provide a better sealing effect with the inner surface of the tire, because they are better able to adapt to any surface irregularities on the surface of the tire which they contact. As exemplary of the type of materials used forming the ring, the edges 7c can be formed of a special soft sealing compound of natural rubber or butyl rubber with a low Shore A hardness in the range of 45–55, while the core or body of the separating ring is formed of a natural rubber compound having good heat conductive features and medium Shore A hardness or a chloroprene compound which is self-extinguishing and also of a medium Shore A hardness where the medium Shore A hardness is in the range of 55–65.

In FIG. 7 the side edges 7c of the ring 7 are provided with grooves 10 which afford a more complete sealing action with the adjacent surfaces of the tire beads. The grooves 10 are shown in FIG. 1, however, in FIG. 2 the side edges 7e of the ring 7 are smooth, that is they do not have the grooves 10, and are used when the surfaces of the separating ring and the tire are glued together. In FIG. 8 the separating ring 7 is shown with the same material forming its main body portion as well as the side edges and the side edges are also provided with grooves 10 for ensuring a more complete sealing action with the surfaces of the tire.

Figure 2:
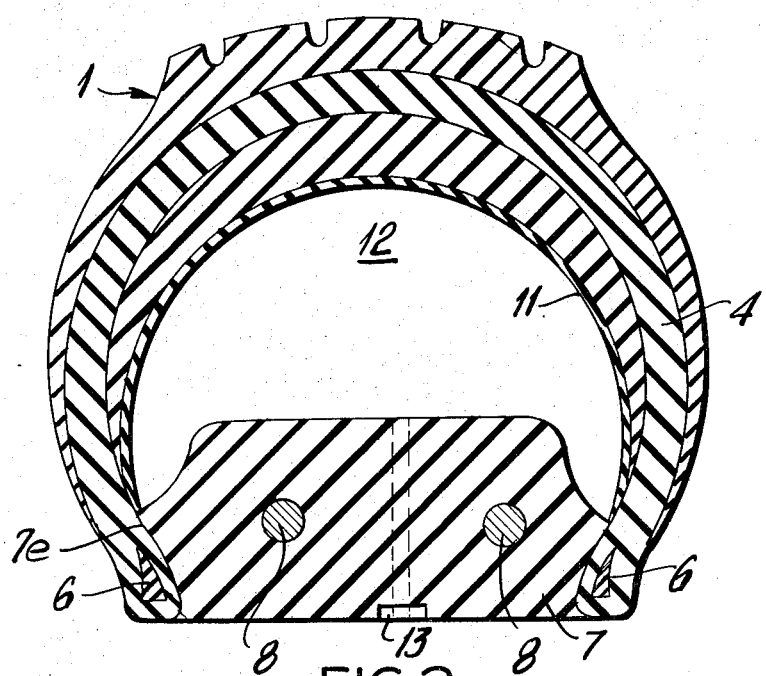
FIG. 2 is a transverse view, similar to FIG. 1, of another embodiment of the present invention but without the wheel rim indicated.

When the tire arrangement as shown in FIG. 2 is used, it is particularly advantageous for use without pressurization in the chamber 12 within the tire.

To afford a hermetical seal for the inner surface of the tire, a layer 11 is formed on the interior surface of the tire to assure the desired sealing characteristics. The layer 11 has a thickness of about 3 mm and is formed of a special elastomer, such as a special natural rubber compound or a butyl rubber compound or mixture. Where a natural rubber compound is used it is a compound which retains maximum tensile strength and elongation at break in the high temperature range of 100–120°C and has the following part content:

| Smoke sheet | 100 |
| Dicup | 3 |
| Limbux | 2 |
| Flectol H | 2 |
| ZMBI | 2 |
| Methasan | 3 |
| Zinc Oxide | 25 |
| FEF black | 25 |

Where a butyl rubber compound or mixture is used it is of butylic resistance with maximum barrier and resistance to heat, and good adhesion and has the following part content:

| Butyl 400 | 92.50 |
| Neoprene WRT | 7.50 |
| Mineral Oil | 10.00 |
| Carbon black | 60.00 |
| Stearic acid | 1.00 |
| Amberol ST 137 | 12.00 |

These compounds are extended on a ram extruder, such as a Barwell, and it is applied inside the tire casing with the help of suitable rubber cements and afterwards is cured by a steam bag inserted into the tire. With the elastic separating ring 7 positioned between the interior surfaces of the tire and securing the beads of the tire against the flanges 3 of the wheel rim 2, a complete hermetic seal is provided for the cavity or chamber 12 within the tire so that loss of pressure is avoided. As indicated in FIG. 2, the tire can be inflated through a valve 13 or its pressure can be checked through the valve. The valve 13 is vulcanized into the separating ring 7 so that the necessity of a special rim for tubeless tires is obviated.

Figure 3:
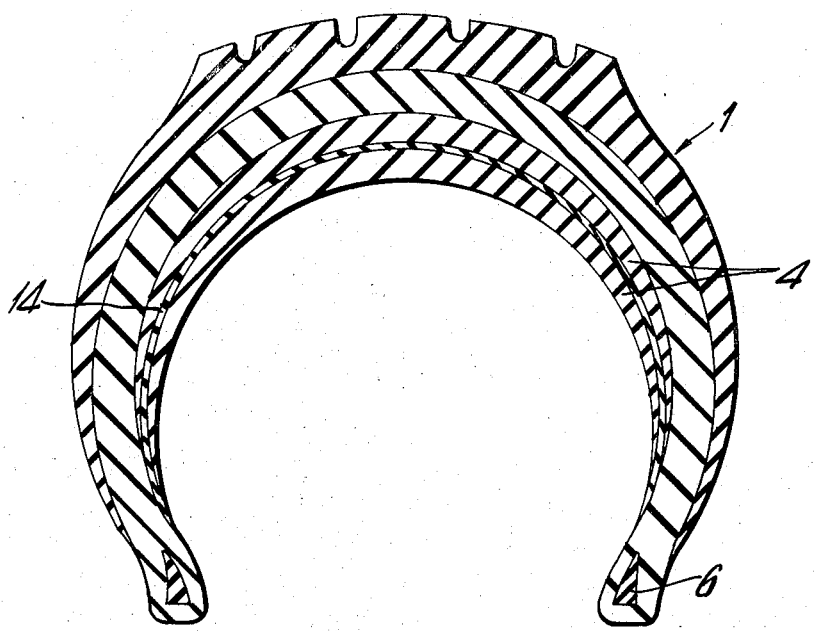
FIG. 3 is a transverse view of a portion of the tire assembly illustrating another embodiment of the reinforcing construction of the tire.
Figure 4:
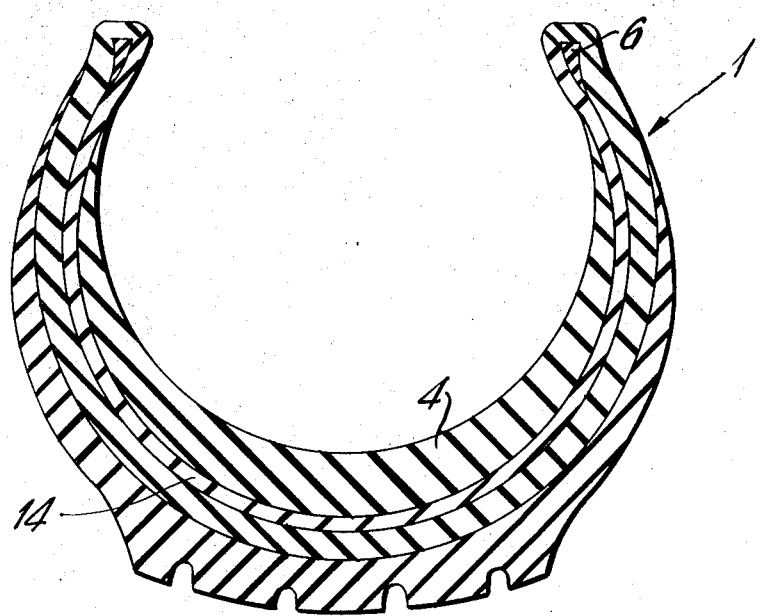
FIG. 4 is a transverse view, similar to FIG. 3 illustrating yet another embodiment of the reinforcing construction of the tire.
Figure 5:
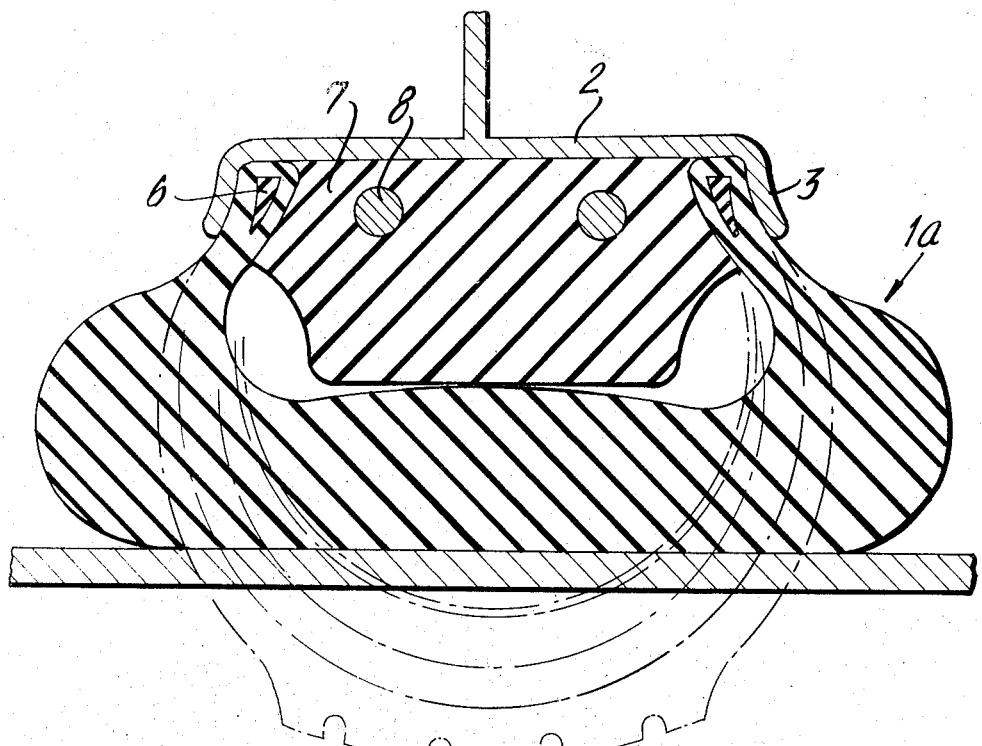
FIG. 5 is a transverse view of the tire assembly in accordance with the present invention indicating the deformation of the tire when it is damaged and loses pressure.

In FIGS. 1 and 2 the reinforcing layer 4 is located within the body of the tire spaced from both its inner and outer surfaces. In FIGS. 3 and 4 the reinforcing layer 4 is shown forming the inner portion of the tire body and having a layer of a special sealing elastomer 14 located intermediate the inner and outer surfaces of the reinforcing layer. With the layer 4 on the interior of the tire and with the layer 14 located within the reinforcing layer, it is possible to provide an air chamber within the tire when it is operating under excessive loads or when it is damaged to afford the additional support necessary for the tire in carrying the static or dynamic load of the vehicle. Since the radial dimension of the separating ring 7 is greater than the height of the flanges 3 on the rim 2, it is possible to prevent the flanges from contacting the side walls of the tire and damaging them if the sides of the tire should flex under other than normal conditions. However, even if the tire is damaged, the vehicle can continue to be driven on the damaged tire, because the load carried by the tire is supported on the elastic separating ring itself and, as shown in FIG. 5, it is possible to prevent the flanges 3 from damaging the side walls of the tire. In FIG. 5 the tire 1A is shown in a collapsed condition in full lines and is shown in the normal operating condition in dashed lines. When the tire is flexed because of damage or reduced pressure conditions within its chamber or cavity, the tread and adjacent portions of the side walls flatten out and the radially outer surface of the separating ring 7 moves into supporting contact with the inner surface of the tread portion of the tire. Accordingly, it is possible to continue to drive the vehicle, since the tire is not damaged and is held on the wheel rim 2 by means of the separating ring.

Figure 6:
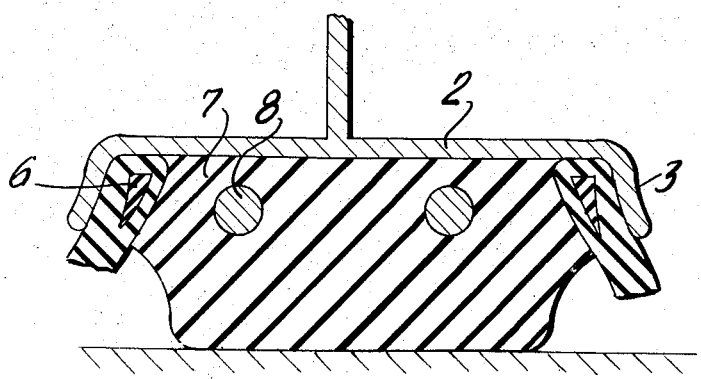
FIG. 6 is a transverse section of a portion of the tire assembly mounted on the tire rim but without the tire body.

Another feature of the present invention is indicated in FIG. 6, where the separating ring 7 is mounted on the wheel rim 2 without the tire 1 for permitting the vehicle to be driven at reduced speed, such as in a shop during manufacture or during servicing. To assure that the ring 7 is held in place between the flanges 3 of the wheel rim, bead portions of a tire are provided between the side edges of the ring and the flanges of the rim. Such beads 6, as shown in FIG. 6, can be cut from old tires.

In another embodiment, the separating ring can be manufactured without reinforcement or with reduced internal reinforcement by providing beads on the separating ring which support the tire.

To reinforce the side walls of the tire to afford the greatest resistance possible against perforation by bullets and other projectiles, the layers of the tire can be reinforced with steel wire and with additional steel material reinforcing.

While specific embodiments of the invention have been shown and described in detail to illustrate the application of the inventive principles, it will be understood that the invention may be embodied otherwise without departing from such principles.

What is claimed is:

1. An inflatable tubeless tire for a motor vehicle, especially adapted for use as a bullet-proof tire capable of continued use though the pressurization of the tire is lost, including an outer surface forming the wearing surface and outside walls of the tire, an inner surface defining the inner space within the tire and beads formed along the free edges of the tire at the entrance to its interior space for seating the tire within the rim of a wheel, wherein the improvement comprises a separate elastic separating ring extending circumferentially for the full extent of the entrance to the interior space within said tire and extending between the oppositely disposed sides of the inner surface of said tire at the entrance to the interior space, said separating ring forcing said beads outwardly and securing them in a tightly held manner against the rim of a wheel, said elastic separating ring having a radially inwardly facing surface arranged to contact the rim of a wheel and a radially outwardly facing surface arranged in spaced relationship from the oppositely disposed inner surface of said tire, the radial dimension between the radially inwardly facing surface and the radially outwardly facing surface being appreciably greater than the radial dimension of the free edges of the tire which contact the rim of the wheel so that the radially outwardly facing surface is spaced radially into the interior space in said tire in spaced relationship from the radially outer portion of the free edges of the tire which contact the rim, said radially outwardly facing surface of said ring being spaced radially inwardly from the oppositely disposed inner surface of the tire which is located opposite the wearing surface, and means associated with said elastic separating ring for supplying air into the interior space defined by the inner surface of said tire and the radially outwardly facing surface of said separating ring so that under ordinary operating conditions when pressurized air is filled into the interior space said radially outwardly facing surface of said ring and the oppositely disposed inner surface of the tire are maintained in spaced relationship and, when the pressurized condition within the interior space in the tire is lost, the inner surface of the wearing surface of the tire is forced inwardly into contact with said radially outwardly facing surface of said ring with the side surfaces of the tire remaining spaced radially outwardly from the rim of the wheel so that the tire can continue to be used without damage to the side walls of the tire by the rim.

2. A tire, as set forth in claim 1, wherein the side wall portions of the tire are thicker than the tread portions of the tire.

3. A tire, as set forth in claim 2, wherein said side wall portions of the tire are three times thicker than the standard side wall portion thickness of a tire.

4. A tire, as set forth in claim 1, wherein a reinforcing elastomer layer is formed within the body of the tire extending between the bead portions thereof.

5. A tire, as set forth in claim 4, wherein said reinforcing elastomer layer is formed of natural rubber butyl compound.

6. A tire, as set forth in claim 4, wherein said reinforcing elastomer layer is formed of bromobutyl rubber.

7. A tire, as set forth in claim 4, wherein said reinforcing elastomer layer is located within the body of the tire spaced between the outer surface and inner surface of the tire.

8. A tire, as set forth in claim 7, wherein a layer of an elastomer consisting of a natural rubber compound is deposited on the inner surface of the tire within its interior space for forming a seal therefor, and said natural rubber compound retains maximum tensile strength and elongation at break at high temperatures in the range of 100–120°C and consists of a mixture having the following part contents:

| | |
|---|---|
| Smoke sheet | 100 |
| Dicup | 3 |
| Limbux | 2 |
| Flectol H | 2 |
| ZMBI | 2 |
| Methasan | 3 |
| Zinc Oxide | 25 |
| FEF black | 25 | and the compound is extended on a ram extruder and applied to the inner surface of the tire with the help of suitable rubber cements and cured by a steam bag inserted into the tire.

9. A tire, as set forth in claim 7, wherein a layer of an elastomer consisting of butyl rubber compound is deposited on the inner surface of the tire within the interior space for forming a seal therefor, and said butyl rubber compound has butylic resistance with maximum barrier and resistance to heat, good adhesion and consists of a mixture having the following part contents:

| | |
|---|---|
| Butyl 400 | 92.50 |
| Neoprene WRT | 7.50 |
| Mineral oil | 10.00 |
| Carbon black | 60.00 |
| Stearic acid | 1.00 |
| Amberol ST 137 | 12.00 | and the compound is extended on a ram extruder and applied to the inner surface of the tire with the help of suitable rubber cements and cured by a steam bag inserted into the tire.

10. A tire, as set forth in claim 4, wherein said reinforcing elastomer layer forms the inner surface of the tire.

11. A tire, as set forth in claim 10, wherein a layer of an elastomer consisting of a natural rubber compound is positioned interiorly within said reinforcing elastomer layer for forming a seal for the interior surface within the tire.

12. A tire, as set forth in claim 10, wherein a layer of an elastomer consisting of a butyl rubber compound is positioned interiorly within said reinforcing elastomer layer for forming a seal for the interior space within the tire.

13. A tire, as set forth in claim 4, wherein steel reinforcing is provided within the side walls and tread of the tire for affording greater resistance to perforation by projectiles.

14. A tire, as set forth in claim 1, wherein the side walls of the tire are flexible and sufficiently stable to retain in combination with said elastic ring the general configuration of the tire so that its use can be continued when the pressure within the interior space of the tire is reduced below normal operating conditions.

15. A tire, as set forth in claim 1, wherein the edges of said elastic separating ring which contact the bead portions of the tire on the opposite sides of the side walls of the tire from the rim on the wheel is formed of an elastomer which is softer than the elastomer forming the remainder of said ring for effecting a more complete sealing action with the surface of the tire.

16. A tire, as set forth in claim 15, wherein the side edges of said elastic separating ring in contact with said tire have recesses for forming a more complete sealing action with the surface of the tire.

17. A tire, as set forth in claim 16, wherein said recesses in the side edges of said elastic separating ring extend in the circumferential direction of said ring.

18. A tire, as set forth in claim 15, wherein the elastomer forming the edges of said elastic separating ring is formed of natural rubber having a low Shore A hardness in the range of 45–55 and the remainder of said ring is formed of a natural rubber compound of good heat conductive features and medium Shore A hardness in the range of 55–65.

19. A tire, as set forth in claim 15, wherein the elastomer forming the edges of said elastic separating ring is formed of a natural rubber having a low Shore A hardness in the range of 45–55 and the remainder of said ring is formed of a chloroprene compound which is self-extinguishing and of medium Shore A hardness in the range of 55–65.

20. A tire, as set forth in claim 15, wherein the elastomer forming the edges of said elastic separating ring is formed of a natural rubber having a low Shore A hardness in the range of 45–55 and the remainder of said ring is formed of a polyurethene compound of medium Shore A hardness in the range of 55–65.

21. A tire, as set forth in claim 15, wherein the elastomer forming the edges of said elastic separating ring is formed of a butyl rubber having a low Shore A hardness in the range of 45–55 and the remainder of said ring is formed of a natural rubber compound of good heat conductive features and medium Shore A hardness in the range of 55–65.

22. A tire, as set forth in claim 15, wherein the elastomer forming the edges of said elastic separating ring is formed of a butyl rubber having a low Shore A hardness in the range of 45–55 and the remainder of said ring is formed of a chloroprene compound which is self-extinguishing and of medium Shore A hardness in the range of 55–65.

23. A tire, as set forth in claim 15, wherein the elastomer forming the edges of said elastic separating ring is formed of a butyl rubber having a low Shore A hardness in the range of 45–55 and the remainder of said ring is formed of a polyurethene compound of medium Shore A hardness in the range of 55–65.

24. A tire, as set forth in claim 1, wherein one of the radially inner and outer surfaces of said elastic separating ring extending between the side edges thereof contain spaced recesses extending in the direction between the side edges.

25. A tire, as set forth in claim 1, wherein said elastic separating ring has a circumferentially extending hollow channel formed within its interior.

26. A tire, as set forth in claim 1, wherein said elastic separating ring has laterally extending projections on the side edges thereof for supporting the tire.

* * * * *